United States Patent
Nakashima et al.

(10) Patent No.: US 12,281,193 B2
(45) Date of Patent: Apr. 22, 2025

(54) BLOCKED ISOCYANATE COMPOSITION, PRODUCTION METHOD THEREOF, CURING AGENT FOR PAINT, PAINT COMPOSITION AND COATED FILM

(71) Applicant: TOSOH CORPORATION, Shunan (JP)

(72) Inventors: Yuji Nakashima, Yokkaichi (JP); Shuto Noguchi, Yokkaichi (JP); Mitsushige Ikemoto, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 0 days.

(21) Appl. No.: 18/597,171

(22) Filed: Mar. 6, 2024

(65) Prior Publication Data
US 2024/0301123 A1    Sep. 12, 2024

(30) Foreign Application Priority Data

Mar. 10, 2023   (JP) .................................. 2023-037806

(51) Int. Cl.
*C08G 18/80* (2006.01)
*C09D 175/04* (2006.01)

(52) U.S. Cl.
CPC ....... *C08G 18/8077* (2013.01); *C09D 175/04* (2013.01); *C08G 2150/00* (2013.01)

(58) Field of Classification Search
None
See application file for complete search history.

(56) References Cited

U.S. PATENT DOCUMENTS

| 4,246,132 A | 1/1981 | Gras et al. |
| 5,296,160 A | 3/1994 | Tirpak et al. |
| 5,646,228 A * | 7/1997 | Gras ................... C08G 18/8061 528/45 |
| 2016/0200858 A1* | 7/2016 | Fukuda ................ C09J 175/04 540/531 |
| 2022/0363808 A1* | 11/2022 | Yamauchi .......... C08G 18/4269 |

FOREIGN PATENT DOCUMENTS

| CN | 107325262 A | 11/2017 | |
| CN | 114096580 A | 2/2022 | |
| JP | H2-620 A | 1/1990 | |
| JP | H07-258598 A | 10/1995 | |
| JP | H08-041163 A | 2/1996 | |
| JP | 2004-323803 A | 11/2004 | |
| JP | 2005-336372 A | 12/2005 | |
| JP | 2007-224202 A | 9/2007 | |
| TW | 201809053 A | 3/2018 | |
| TW | 202309147 A | 3/2023 | |
| WO | WO-2020262512 A1 * | 12/2020 | ............. B32B 27/00 |

OTHER PUBLICATIONS

Notice of Reasonse for Refusal dated May 8, 2023, for Japanese Patent Application No. 2023-037806, with English translation, 4 pages.

European Search Report dated Jul. 17, 2024, for European Patent Application No. 24161681.2, 4 pages.

* cited by examiner

*Primary Examiner* — Christopher M Rodd

(74) *Attorney, Agent, or Firm* — Squire Patton Boggs (US) LLP

(57) ABSTRACT

A production method of a blocked isocyanate composition, including a step of mixing and reacting a polyisocyanate and an oxime-based blocking agent, in which a ratio of an amount of the oxime-based blocking agent mixed to an amount of the polyisocyanate mixed is 0.91 to 0.99 in terms of an equivalent ratio.

7 Claims, No Drawings

BLOCKED ISOCYANATE COMPOSITION, PRODUCTION METHOD THEREOF, CURING AGENT FOR PAINT, PAINT COMPOSITION AND COATED FILM

CROSS-REFERENCE TO RELATED APPLICATIONS

This application is based upon and claims the benefit of priority from Japanese Patent Application No. 2023-037806, filed on Mar. 10, 2023, the entire contents of which are incorporated herein by reference.

TECHNICAL FIELD

The present disclosure relates to a blocked isocyanate composition, a production method thereof, a curing agent for paint, a paint composition and a coated film.

BACKGROUND

Conventionally, polyisocyanates are known as a component of compositions that are used for paint and the like. For example, polyurethane resin paint obtained by combining a polyol and a polyisocyanate is known to have extremely excellent wear resistance, chemical resistance and stain resistance.

Paint containing a polyisocyanate as a curing agent is ordinarily a two-liquid type composition. A main agent component (for example, a polyol) and the polyisocyanate are separately stored and are used having been mixed during painting. However, since paint cures within a short period of time once the components are mixed together, the pot life is short and there is a problem with workability during painting. In addition, since polyisocyanates and water easily react with each other, it is not possible to use the paint as aqueous paint such as electrodeposition paint.

As a coping method for these problems, a method in which a polyisocyanate is inactivated by being reacted with a blocking agent is known. A blocked isocyanate obtained by this method does not react with a main agent component (for example, a polyol) at normal temperature but, when heated, regenerates an isocyanate group due to the dissociation of the blocking agent and reacts with the main agent component to form a crosslink. Therefore, according to the above-described method, the pot life is not limited, and it becomes possible to mix the main agent component and the curing agent component in advance to produce paint and to apply polyisocyanates to aqueous paint.

As the blocking agent of the polyisocyanate, for example, a lactam-based blocking agent, an oxime-based blocking agent, a phenolic blocking agent and the like can be exemplified (Japanese Unexamined Patent Publication No. H2-620).

SUMMARY

Depending on the use of paint, there are cases where high transparency and viscosity stability are required for paint compositions and compositions containing a blocked isocyanate, which is a material of the paint compositions, (hereinafter referred to as "blocked isocyanate compositions"). However, as a result of studies by the inventors of the present disclosure, it was clarified that, in a case where an oxime-based blocking agent is used as a blocking agent, coloration and viscosity change occur over time in the blocked isocyanate composition.

An objective of one aspect of the present disclosure is to provide a blocked isocyanate composition in which coloration and viscosity change are less likely to occur over time.

Conventionally, at the time of synthesizing a blocked isocyanate, since the blocking effect is reduced when a free isocyanate group remains in the blocked isocyanate, the same equivalent or excess equivalent of a blocking agent as a polyisocyanate was used to prevent the remaining of a free isocyanate group. Surprisingly, the inventors of the present disclosure found that, contrary to the above-described conventional technical common sense, the occurrence of the above-described coloration over time can be suppressed while sufficiently guaranteeing the blocking effect by setting the amount of a blocking agent used with respect to a polyisocyanate to be smaller than the same equivalent and completed the present disclosure.

The present disclosure provides at least the following [1] to [10].

[1] A production method of a blocked isocyanate composition, including
a step of mixing and reacting a polyisocyanate and an oxime-based blocking agent,
in which a ratio of an amount of the oxime-based blocking agent mixed to an amount of the polyisocyanate mixed is 0.91 to 0.99 in terms of an equivalent ratio.

[2] The production method of a blocked isocyanate composition according to [1], in which the ratio of the amount of the oxime-based blocking agent mixed to the amount of the polyisocyanate mixed is 0.95 to 0.99 in terms of the equivalent ratio.

[3] The production method of a blocked isocyanate composition according to [1] or [2], in which the polyisocyanate contains an aliphatic polyisocyanate having 4 to 6 carbon atoms or a derivative thereof.

[4] A blocked isocyanate composition containing a blocked isocyanate that is a reaction product between a polyisocyanate and a blocking agent or a derivative thereof, in which a ratio of a total amount of an isocyanate group blocked with an oxime-based blocking agent that is contained in the blocked isocyanate to a total amount of an isocyanate group that is contained in the polyisocyanate is 0.91 to 0.99 in terms of a mole ratio.

[5] The blocked isocyanate composition according to [4], in which the ratio of the total amount of the isocyanate group blocked with the oxime-based blocking agent that is contained in the blocked isocyanate to the total amount of the isocyanate group that is contained in the polyisocyanate is 0.95 to 0.99 in terms of the mole ratio.

[6] The blocked isocyanate composition according to [4] or [5], in which the polyisocyanate contains an aliphatic polyisocyanate having 4 to 6 carbon atoms or a derivative thereof.

[7] The blocked isocyanate composition according to any one of [4] to [6], in which the blocked isocyanate has a free isocyanate group.

[8] A curing agent for paint composed of the blocked isocyanate composition according to any one of [4] to [7].

[9] A paint composition containing a main agent component and a curing agent component,
in which the curing agent component contains the blocked isocyanate composition according to any one of [4] to [7].

[10] A coated film that is formed of the paint composition according to [9].

According to the present disclosure, it is possible to provide a blocked isocyanate composition in which coloration and viscosity change are less likely to occur over time.

DETAILED DESCRIPTION

Hereinafter, exemplary embodiments of the present disclosure will be described. However, the present disclosure is not limited to the following embodiments by any means. In the present specification, a numerical range expressed using "to" indicates a range including numerical values shown before and after "to" as the minimum value and the maximum value, respectively. In addition, unless clearly indicated specifically, the units of numerical values shown before and after "to" are the same. In addition, individually shown maximum values and minimum values can be arbitrarily combined together.

Production Method of Blocked Isocyanate Composition

One embodiment of the present disclosure is a production method of a blocked isocyanate composition including a step of mixing and reacting a polyisocyanate and an oxime-based blocking agent (hereinafter, also referred to as "blocking step"), in which the ratio of the amount of the oxime-based blocking agent mixed to the amount of the polyisocyanate mixed is 0.91 to 0.99 in terms of the equivalent ratio. In the calculation of the equivalent ratio, the ratio is rounded off to two decimal places.

In the production method, the oxime-based blocking agent reacts with the polyisocyanate, whereby isocyanate groups in the polyisocyanate are blocked with the oxime-based blocking agent. A blocked isocyanate composition that is obtained by the above-described production method contains the blocked isocyanate that is generated as described above or a derivative thereof.

The blocked isocyanate composition that is obtained by the production method is a composition in which coloration and viscosity change over time are less likely to occur (that is, coloration resistance and viscosity retention are excellent). The reason therefor is not clear, but the inventors of the present disclosure assume as described below. That is, it is considered that, in conventional methods in which a polyisocyanate and the same equivalent or excess equivalent of a blocking agent are used, the unreacted oxime-based blocking agent remains in a blocked isocyanate composition, and the remaining blocking agent decomposes or the like over time, whereby coloration and viscosity change occur. On the other hand, it is assumed that, in the method of the embodiment, the ratio of the amount of the oxime-based blocking agent mixed to the amount of the polyisocyanate mixed is 0.99 or less in terms of the equivalent ratio, whereby the amount of the remaining oxime-based blocking agent becomes zero or an extremely trace amount, and the occurrence of the coloration and viscosity change over time is thus suppressed. In addition, it is assumed that, since urethane bonds are formed in the reaction between the oxime-based blocking agent and the isocyanate groups, the isocyanate groups blocked with the oxime-based blocking agent are stabler in a storage temperature range (for example, 5° C. to 35° C.) than isocyanate groups blocked with other blocking agents (for example, an active methylene-based blocking agent, an amine-based blocking agent or the like) and are less likely to cause dissociation of the blocking agent over time. Therefore, it is assumed that, in the production method, the ratio of the amount of the oxime-based blocking agent mixed to the amount of the polyisocyanate mixed is set to 0.91 or more in terms of the equivalent ratio, whereby, in the storage temperature range, a majority of the isocyanate groups in the polyisocyanate are maintained in a state of being blocked with the oxime-based blocking agent and, consequently, viscosity change over time is suppressed.

A polyisocyanate is a compound having a plurality of isocyanate groups. The polyisocyanate that is used in the blocking step is a polyisocyanate having no isocyanate groups blocked with a blocking agent.

Examples of the polyisocyanate include an aromatic polyisocyanate, an aliphatic polyisocyanate, an alicyclic polyisocyanate and polyisocyanate derivatives thereof. Examples of the derivatives include isocyanurate, allophanate, biuret and the like. The derivatives may be derivatives modified (for example, prepolymerized) using a polyol or the like as a modifier. In addition, the derivatives may be derivatives modified using a tertiary amino alcohol, a poly (oxyalkylene) glycol monoalkyl ether or the like as a modifier. As the polyisocyanate, one polyisocyanate may be used singly or two or more polyisocyanates may be used.

The polyisocyanate preferably has no aromatic rings from the viewpoint of further improving the coloration resistance of the blocked isocyanate composition. Examples of the polyisocyanate having no aromatic rings include aliphatic polyisocyanates such as hexamethylene diisocyanate, tetramethylene diisocyanate, 2-methyl-pentane-1,5-diisocyanate, 3-methyl-pentane-1,5-diisocyanate, lysine triisocyanate and trioxyethylene diisocyanate; alicyclic polyisocyanates such as isophorone diisocyanate, cyclohexyl diisocyanate, hydrogenated diphenylmethane diisocyanate, norbornane diisocyanate, hydrogenated tolylene diisocyanate, hydrogenated xylene diisocyanate and hydrogenated tetramethylxylylene diisocyanate; derivatives thereof; and the like. From the viewpoint of enabling an increase in the NCO content rate and enabling the reduction of the amount of the blocked isocyanate that is used for paint, an aliphatic polyisocyanate having 4 to 6 carbon atoms or a derivative thereof is preferably used and hexamethylene diisocyanate or a derivative thereof is more preferably used. As the derivative of hexamethylene diisocyanate, isocyanurate, allophanate and biuret are preferably used.

Examples of the oxime-based blocking agent include formaldoxime, acetaldoxime, acetone oxime, methyl ethyl ketoxime, methyl isobutyl ketoxime, cyclohexanone oxime and the like. Among these, methyl ethyl ketoxime has an appropriate vapor pressure and excellent handleability. One oxime-based blocking agent may be singly used or two or more oxime-based blocking agents may be used in combination.

The equivalent ratio (that is, the ratio of the amount of the oxime-based blocking agent mixed to the amount of the polyisocyanate mixed) may be 0.93 or more, 0.95 or more or 0.97 or more from the viewpoint of further improving the viscosity retention of the blocked isocyanate composition. The equivalent ratio may be 0.98 or less, 0.96 or less or 0.94 or less from the viewpoint of further improving the coloration resistance of the blocked isocyanate composition. From these viewpoints, the equivalent ratio may be, for example, 0.93 to 0.99, 0.95 to 0.99 or 0.97 to 0.99 or may be 0.91 to 0.98, 0.91 to 0.96 or 0.91 to 0.94. The equivalent ratio can also be said as the ratio of the total amount (unit: mol) of the oxime-based blocking agent to the total amount (unit: mol) of the isocyanate groups that are contained in the polyisocyanate.

In the blocking step, an organic solvent may be used in addition to the polyisocyanate and the oxime-based blocking agent. That is, the reaction between the polyisocyanate and the oxime-based blocking agent may be performed in the presence of an organic solvent. Examples of the organic solvent include aromatic solvents such as toluene and xylene, ketone-based solvents such as acetone, methyl ethyl ketone and methyl isobutyl ketone, ester-based solvents such as ethyl acetate and butyl acetate, glycol ether-based solvents such as ethylene glycol monoethyl ether acetate and propylene glycol monomethyl ether acetate and the like. These solvents may be singly used or two or more solvents may be used in combination.

The mixing and reaction of the polyisocyanate and the oxime-based blocking agent can be performed according to the reaction conditions of normal blocking reactions. In the mixing of the polyisocyanate and the oxime-based blocking agent, the oxime-based blocking agent may be added in instalments to a solution containing the polyisocyanate or the polyisocyanate and the organic solvent as necessary. The reaction between the polyisocyanate and the oxime-based blocking agent may be performed at room temperature (for example, 5° C. to 35° C.) or may be performed while heating a mixed liquid containing the polyisocyanate and the oxime-based blocking agent. Regardless of the presence or absence of heating, the temperature of the mixed liquid during the reaction may be, for example, 20° C. to 200° C.

The end of the reaction between the polyisocyanate and the oxime-based blocking agent can be confirmed by the measurement of the NCO content rate (that is, the mass concentration of the isocyanate groups), the measurement of the infrared spectrum or the like.

In the blocking step, a different blocking agent from the oxime-based blocking agent (hereinafter, referred to as "different blocking agent") may be mixed in in addition to the polyisocyanate and the oxime-based blocking agent. That is, the production method of a blocked isocyanate composition may be a method including a step of mixing and reacting the polyisocyanate, the oxime-based blocking agent and the different blocking agent.

As the different blocking agent, a variety of blocking agents, for example, a phenolic blocking agent, an alcoholic blocking agent, an active methylene-based blocking agent, a mercaptan-based blocking agent, an acid amide-based blocking agent, an acid imide-based blocking agent, an imidazole-based blocking agent blocking agent, a urea-based blocking agent, an amine-based blocking agent, an imide-based compound, a pyrazole-based blocking agent and a triazole-based blocking agent can be used. Specific examples of these blocking agents include phenol, cresol, ethylphenol, butylphenol, 2-hydroxypyridine, butyl cellosolve, propylene glycol monomethyl ether, ethylene glycol, benzyl alcohol, methanol, ethanol, n-butanol, isobutanol, 2-ethylhexanol, dimethyl malonate, diethyl malonate, methyl acetoacetate, ethyl acetoacetate, acetylacetone, butyl mercaptan, dodecyl mercaptan, acetanilide, acetamide, ε-caprolactam, δ-valerolactam, γ-butyrolactam, succinimide, maleimide, imidazole, 2-methylimidazole, urea, thiourea, ethylene urea, diphenylaniline, aniline, carbazole, ethyleneimine, polyethyleneimine, 3,5-dimethylpyrazole, 1,2,4-triazole and the like.

The different blocking agent may be mixed in after the polyisocyanate and the oxime-based blocking agent are mixed and reacted together. That is, the production method of a blocked isocyanate composition may be a method including a first blocking step of mixing and reacting a polyisocyanate and an oxime-based blocking agent and a second blocking step of mixing and reacting a reaction product obtained by the first blocking step and a different blocking agent.

In a blocked isocyanate composition that is obtained by the above-described production method, a polyisocyanate or blocked isocyanate having an unreacted isocyanate group (that is, a free isocyanate group) can be present. The production method may further include a step of modifying an unreacted isocyanate group by a reaction with a modifier (excluding a blocking agent) such as an active hydrogen-containing compound.

Blocked Isocyanate Composition

Another embodiment of the present disclosure is a blocked isocyanate composition containing a blocked isocyanate that is a reaction product between a polyisocyanate and a blocking agent or a derivative thereof, in which the ratio of the total amount of an isocyanate group blocked with an oxime-based blocking agent that is contained in the blocked isocyanate to the total amount of an isocyanate group that is contained in the polyisocyanate is 0.91 to 0.99 in terms of a mole ratio.

The blocked isocyanate composition is a blocked isocyanate composition that is obtained by, for example, the production method of the above-described embodiment. In the blocked isocyanate composition, since the above-described mole ratio is 0.91 to 0.99, coloration and viscosity change over times are less likely to occur.

The blocked isocyanate that is a reaction product between a polyisocyanate and a blocking agent may be, for example, a reaction product between a polyisocyanate and an oxime-based blocking agent. The reaction product has a structure derived from the polyisocyanate and an isocyanate group blocked with the oxime-based blocking agent.

The blocked isocyanate that is a reaction product between a polyisocyanate and a blocking agent may be a reaction product among a polyisocyanate, an oxime-based blocking agent and the above-described different blocking agent (a different blocking agent from the oxime-based blocking agent). The reaction product has a structure derived from the polyisocyanate, an isocyanate group blocked with the oxime-based blocking agent and an isocyanate group blocked with the different blocking agent.

Examples of the polyisocyanate and the blocking agent include those exemplified as the polyisocyanate and the blocking agent that are used in the above-described production method. Preferable examples of the polyisocyanate and the blocking agent are also the same as the preferable examples of the polyisocyanate and the blocking agent that are used in the above-described production method. For example, the polyisocyanate preferably includes a structure derived from an aliphatic polyisocyanate having 4 to 6 carbon atoms or a derivative thereof and more preferably includes a structure derived from hexamethylene diisocyanate or a derivative thereof. That is, the blocked polyisocyanate preferably includes a structure derived from an aliphatic polyisocyanate having 4 to 6 carbon atoms or a derivative thereof and more preferably includes a structure derived from hexamethylene diisocyanate or a derivative thereof. In addition, for example, the blocking agent preferably contains methyl ethyl ketoxime. That is, the blocked polyisocyanate preferably has an isocyanate group blocked with methyl ethyl ketoxime.

The derivative of the reaction product between a polyisocyanate and a blocking agent may be, for example, a modified product obtained by a reaction of the free isocyanate group in the reaction product between a polyisocyanate and a blocking agent with a modifier (excluding a blocking agent) such as an active hydrogen-containing compound.

The blocked isocyanate may have a free isocyanate group. In a case where the blocked isocyanate has a free isocyanate group, there is a tendency that the curability of paint improves.

The mole ratio (that is, the ratio of the total amount of the isocyanate group blocked with the oxime-based blocking agent that is contained in the blocked isocyanate to the total amount of the isocyanate group that is contained in the polyisocyanate) may be 0.93 or more, 0.95 or more or 0.97 or more from the viewpoint of further improving the viscosity retention of the blocked isocyanate composition. The mole ratio may be 0.98 or less, 0.96 or less or 0.94 or less from the viewpoint of further improving the coloration resistance of the blocked isocyanate composition. From these viewpoints, the mole ratio may be, for example, 0.93 to 0.99, 0.95 to 0.99 or 0.97 to 0.99 or may be 0.91 to 0.98, 0.91 to 0.96 or 0.91 to 0.94.

The content of the blocked isocyanate and the derivative thereof in the blocked isocyanate composition may be, for example, 20 to 99 mass %, 40 to 90 mass %, 50 to 80 mass % or 70 to 80 mass % based on the total mass of the composition.

The blocked isocyanate composition may further contain a polyisocyanate that is an unreacted substance aside from the polyisocyanate and the derivative thereof. However, the blocked isocyanate composition preferably does not contain an unreacted blocking agent and more preferably does not contain an unreacted oxime-based blocking agent. Here, the blocked isocyanate composition not containing a blocking agent means that the content of the blocking agent is less than 0.001 mass % based on the total mass of the composition.

The blocked isocyanate composition may further contain an additive, for example, a dissociation catalyst, a pigment, a dye, a dispersion stabilizer, a viscosity modifier, a leveling agent, an anti-gelling agent, a light stabilizer, an antioxidant, an ultraviolet absorber, a heat resistance improver, an inorganic and organic filler, a plasticizer, a lubricant, an antistatic agent or a reinforcing material.

The content rate of an effective isocyanate group in the blocked isocyanate composition (hereinafter, referred to as "effective NCO content rate") may be 6 to 28 mass %, 8 to 22 mass % or 10 to 16 mass % from the viewpoint of enabling the reduction of the amount of the blocked isocyanate used in paint and a lower likelihood of the occurrence of viscosity change. Here, the effective isocyanate group means both the free isocyanate group and the isocyanate group blocked with the blocking agent. The effective NCO content rate indicates the amount of an isocyanate group that is present in the blocked isocyanate composition and capable of getting involved in a crosslinking reaction and is an amount (unit: mass %) based on the total mass of the blocked isocyanate composition. The effective NCO content rate can be obtained by measuring the amount of the free isocyanate group in the isocyanate composition that is obtained by dissociating the blocking agent from the blocked isocyanate. This amount can be obtained by reacting the isocyanate group in a measurement specimen (that is, an isocyanate composition that is obtained by dissociating the blocking agent from the blocked isocyanate) with an excess secondary amine and then performing the back titration on the unreacted secondary amine with hydrochloric acid.

The content rate of the free isocyanate group in the blocked isocyanate composition (hereinafter, referred to as "free NCO content rate") may be 0.1 to 1.5 mass % or may be 0.1 to 1.0 mass % or 0.1 to 0.5 mass % from the viewpoint of further enhancing the curability of paint. The free NCO content rate indicates the amount of the free isocyanate group that is present in the blocked isocyanate composition and is an amount (unit: mass %) based on the total mass of the blocked isocyanate composition. A method for measuring the amount of the free isocyanate group for obtaining the free NCO content rate is the same as the above-described method.

The viscosity of the blocked isocyanate composition at 25° C. may be, for example, 500 to 5000 mPa·s or may be 100 to 10000 mPa·s or 10 to 100000 mPa·s from the viewpoint of handleability. The viscosity is a value that is measured using a B-type viscometer.

The blocked isocyanate composition can be used as a curing agent component of paint compositions. Therefore, the blocked isocyanate composition can also be called a curing agent for paint.

Paint Composition

Still another embodiment of the present disclosure is a paint composition containing a main agent component and a curing agent component, in which the curing agent component contains the blocked isocyanate composition of the above-described embodiment.

The paint composition may be a one-liquid type composition in which all of a configuration component is contained in one liquid or may be a multi-liquid type composition in which configuration components are separately present in a plurality of liquids. The multi-liquid type paint composition may contain a first liquid containing a main agent component and a second liquid containing a curing agent component. In this case, the blocked isocyanate composition of the above-described embodiment is the second liquid.

Since the paint composition contains the blocked isocyanate composition of the above-described embodiment as the curing agent component, viscosity change over time is less likely to occur even in a case where the paint composition is produced as one liquid. Therefore, a problem of the heterogenization of the main agent component and the curing agent component, which acts as a cause of the deterioration of the performance as paint, is less likely to be caused. In addition, the above-described paint composition makes it possible to form coated films having excellent transparency for the same reason.

The main agent contains, for example, an active hydrogen group-containing compound. Examples of the active hydrogen group include a hydroxy group, an amino group and the like. The average number of functional groups in the active hydrogen group-containing compound (the average number of active hydrogen groups) is two or more and preferably two to 50. Examples of the active hydrogen group-containing compound having such an average number of functional groups include polyols, polyamines, amino alcohols and the like.

The number-average molecular weight of the active hydrogen group-containing compound is, for example, 500 to 20000 and preferably 500 to 10000. Examples of active hydrogen group-containing compounds having such a number-average molecular weight include polyurethane resins, polyamide resins, saturated or unsaturated polyester resins, alkyd resins modified with a saturated fatty acid or an unsaturated fatty acid, acrylic resins, fluororesins, epoxy resins, cellulose resins and the like (which are all resins having an active hydrogen group). Furthermore, when coated film performance such as gloss, thixotropy, hardness, durability, flexibility or drying properties or the cost is taken into account, saturated or unsaturated polyester resins, alkyd resins modified with a saturated fatty acid or an unsaturated fatty acid, acrylic resins are preferable.

The blending ratio between the main agent component and the curing agent component in the paint composition may be adjusted based on the ratio of the total amount of the effective isocyanate group in the curing agent component to the total amount of the active hydrogen group in the main agent component. The ratio of the total amount of the effective isocyanate group in the curing agent component to the total amount of the active hydrogen group in the main agent component is preferably 1/9 to 9/1 and more preferably 2/8 to 8/2 in terms of the mole ratio. When the mole ratio is within the above-described range, favorable curability can be obtained.

The paint composition can be used as top and intermediate coating paint for automobiles, anti-chipping paint, electrodeposition paint, paint for automobile parts, paint for automobile repair, pre-coated metals and anti-corrosion steel sheets for metal products such as home appliances and office equipment, paint for construction materials, paint for plastics, adhesives, adhesive agents, sealants and the like.

Coated Film

Far still another embodiment of the present disclosure is a coated film that is formed of the paint composition of the above-described embodiment.

The coated film includes a cured product of the paint composition of the embodiment. The coated film can be formed by applying the paint composition on a base material by a well-known method and curing a coated film composed of the paint composition (uncured coated film). Examples of the well-known method include roll painting, curtain flow painting, spray painting, electrostatic painting, bell painting, electrodeposition painting and the like. The amount of the paint composition applied, the thickness of the coated film and the like may be set as appropriate depending on the material of a surface to be painted or the like. The curing conditions (for example, baking conditions) of the coated film composed of the paint composition also vary with the kinds of the blocking agent and the main agent or the like, but the coated film sufficiently cures by being heated at 150° C. to 160° C. for 30 minutes when the coated film is a blocked polyisocyanate for which methyl ethyl ketoxime is used.

Hereinafter, the contents of the present disclosure will be described in more detail using examples and comparative examples, but the present disclosure is not limited to the following examples.

Example 1

520 g of CORONATE HXR (manufactured by Tosoh Corporation, hexamethylene diisocyanate trimer, NCO content rate: 21.8 mass %) as a polyisocyanate and 250 g of butyl acetate were charged into a four-neck flask having a capacity of 1 liter and including a stirrer, a thermometer, a cooling tube and a nitrogen seal tube and stirred for 30 minutes, and 230 g of methyl ethyl ketoxime (manufactured by Ube Industries, Ltd.) (the equivalent ratio (ratio R in Table 1) to the amount of the polyisocyanate (CORONATE HXR) mixed was 0.98) was charged thereinto in three separate instalment in a manner that the temperature did not exceed 80° C. After that, the components were held at 70° C. and stirred for two hours, thereby obtaining a blocked isocyanate composition of Example 1.

The effective NCO content rate and free NCO content rate of the blocked isocyanate composition obtained by the following methods were 11.3 mass % and 0.2 mass %, respectively.

Calculation of Effective NCO Content Rate

A secondary amine excessive with respect to an isocyanate group was added to the blocked isocyanate composition and heated at the dissociation temperature of the oxime-based blocking agent or higher (for example, 160° C.) for a time during which the blocking agent sufficiently dissociated (for example, one hour), the free isocyanate group and the secondary amine were reacted together, and back titration was then performed on the unreacted secondary amine with hydrochloric acid, thereby obtaining the effective NCO content rate.

Calculation of Free NCO Content Rate

The isocyanate group in the blocked isocyanate composition was reacted with an excess secondary amine, and back titration was then performed on the unreacted secondary amine with hydrochloric acid, thereby obtaining the free NCO content rate.

Examples 2 and 3 and Comparative Examples 1 and 2

Blocked isocyanate compositions of Examples 2 and 3 and Comparative Examples 1 and 2 were obtained in the same manner as in Example 1 except that the ratio of the amount of the oxime-based blocking agent (methyl ethyl ketoxime) mixed to the amount of the polyisocyanate (CORONATE HXR) mixed in terms of the equivalent ratio was adjusted so as to be values (ratio R) shown in Table 1, respectively. In addition, the effective NCO content rates and the free NCO content rates of the blocked isocyanate compositions obtained in Examples 2 and 3 and Comparative Examples 1 and 2 were calculated in the same manner as in Example 1. The effective NCO content rate and the free NCO content rate of the blocked isocyanate composition obtained in Example 2 were 11.4 mass % and 0.6 mass %, respectively. The effective NCO content rate and the free NCO content rate of the blocked isocyanate composition obtained in Example 3 were 11.6 mass % and 1.0 mass %, respectively. The effective NCO content rate and the free NCO content rate of the blocked isocyanate composition obtained in Comparative Example 1 were 11.3 mass % and 0 mass %, respectively. The effective NCO content rate and the free NCO content rate of the blocked isocyanate composition obtained in Comparative Example 2 were 11.6 mass % and 1.2 mass %, respectively.

Evaluation

Coloration Resistance Evaluation

The resistance to coloration over time of the blocked isocyanate compositions of Examples 1 to 3 and Comparative Examples 1 and 2 was evaluated based on a change rate after the blocked isocyanate composition was stored at 45° C. for two weeks, the b* values of the blocked isocyanate composition based on the CIE Lab were measured before and after the storage, and the change rate of the b* value before and after the storage (the initial b* value and the b* value after the storage) was obtained from the following equation. The b* value was measured using a spectrophotometer COH 7700 manufactured by NIPPON DENSHOKU INDUSTRIES Co., Ltd.

Change rate of $b^*$ value (unit: %) =

$100 \times (b^*$ value after storage $-$ initial $b^*$ value)/initial $b^*$ value Evaluation standards are as described below.
A: The change rate of the b* value is -50% or more and less than 50%
B: The change rate of the b* value is 50% or more and less than 100%
C: The change rate of the b* value is 100% or more Viscosity Retention Evaluation The viscosity retention of the blocked isocyanate compositions of Examples 1 to 3 and Comparative Examples 1 and 2 were evaluated based on a change rate after the blocked isocyanate composition was stored at 45° C. for two weeks, the viscosities of the blocked isocyanate composition were measured before and after the storage, and the change rate of the viscosity before and after the storage (the initial viscosity and the viscosity after the storage) was obtained from the following equation. The viscosity was measured at 25° C. using a B-type viscometer.

Viscosity change rate (unit: %) =

$|100 \times$ (viscosity after storage $-$ initial viscosity)/initial viscosity$|$ Evaluation standards are as described below.
A: The change rate of the viscosity is less than 20%
B: The change rate of the viscosity is 20% or more and less than 30%
C: The change rate of the viscosity is 30% or more

What is claimed is:

1. A production method of a blocked isocyanate composition, comprising:
    a step of mixing and reacting a polyisocyanate and an oxime-based blocking agent,
    wherein a ratio of an amount of the oxime-based blocking agent mixed to an amount of the polyisocyanate mixed is 0.91 to 0.99 in terms of an equivalent ratio, and
    wherein the polyisocyanate contains an aliphatic polyisocyanate having 4 to 6 carbon atoms or a derivative thereof,
    wherein the blocked isocyanate composition has a free isocyanate group, and
    wherein the content rate of the free isocyanate in the blocked isocyanate is from 0.1 to 1.5 mass %.

2. The production method of a blocked isocyanate composition according to claim 1,
    wherein the ratio of the amount of the oxime-based blocking agent mixed to the amount of the polyisocyanate mixed is 0.97 to 0.99 in terms of the equivalent ratio.

3. A blocked isocyanate composition comprising:
    a blocked isocyanate that is a reaction product between a polyisocyanate and an oxime-based blocking agent or a derivative thereof,
    wherein a ratio of a total amount of an isocyanate group blocked with an oxime-based blocking agent that is contained in the blocked isocyanate to a total amount of an isocyanate group that is contained in the polyisocyanate is 0.91 to 0.99 in terms of a mole ratio,
    wherein the polyisocyanate contains an aliphatic polyisocyanate having 4 to 6 carbon atoms or a derivative thereof,
    wherein the blocked isocyanate has a free isocyanate group, and
    wherein the content rate of the free isocyanate in the blocked isocyanate is from 0.1 to 1.5 mass %.

4. The blocked isocyanate composition according to claim 3,
    wherein the ratio of the total amount of the isocyanate group blocked with the oxime-based blocking agent that is contained in the blocked isocyanate to the total amount of the isocyanate group that is contained in the polyisocyanate is 0.957 to 0.99 in terms of the mole ratio.

5. A curing agent for paint composed of the blocked isocyanate composition according to claim 3.

TABLE 1

|  |  | Example 1 | Example 2 | Example 3 | Comparative Example 1 | Comparative Example 2 |
|---|---|---|---|---|---|---|
|  | Ratio R | 0.98 | 0.95 | 0.91 | 1.02 | 0.89 |
| Coloration resistance | b* value change rate (%) | 27 | −3 | −9 | 362 | −15 |
|  | Evaluation | A | A | A | C | A |
| Viscosity retention | Initial viscosity (mPa · s at 25° C.) | 1380 | 1270 | 1150 | 1300 | 1080 |
|  | Viscosity change rate (%) | 6 | 20 | 25 | 34 | 32 |
|  | Evaluation | A | B | B | C | C |

6. A paint composition comprising:
a main agent component; and
a curing agent component,
wherein the curing agent component contains the blocked isocyanate composition according to claim 3.

7. A coated film that is formed of the paint composition according to claim 6.

\* \* \* \* \*